United States Patent Office 3,426,703
Patented Feb. 11, 1969

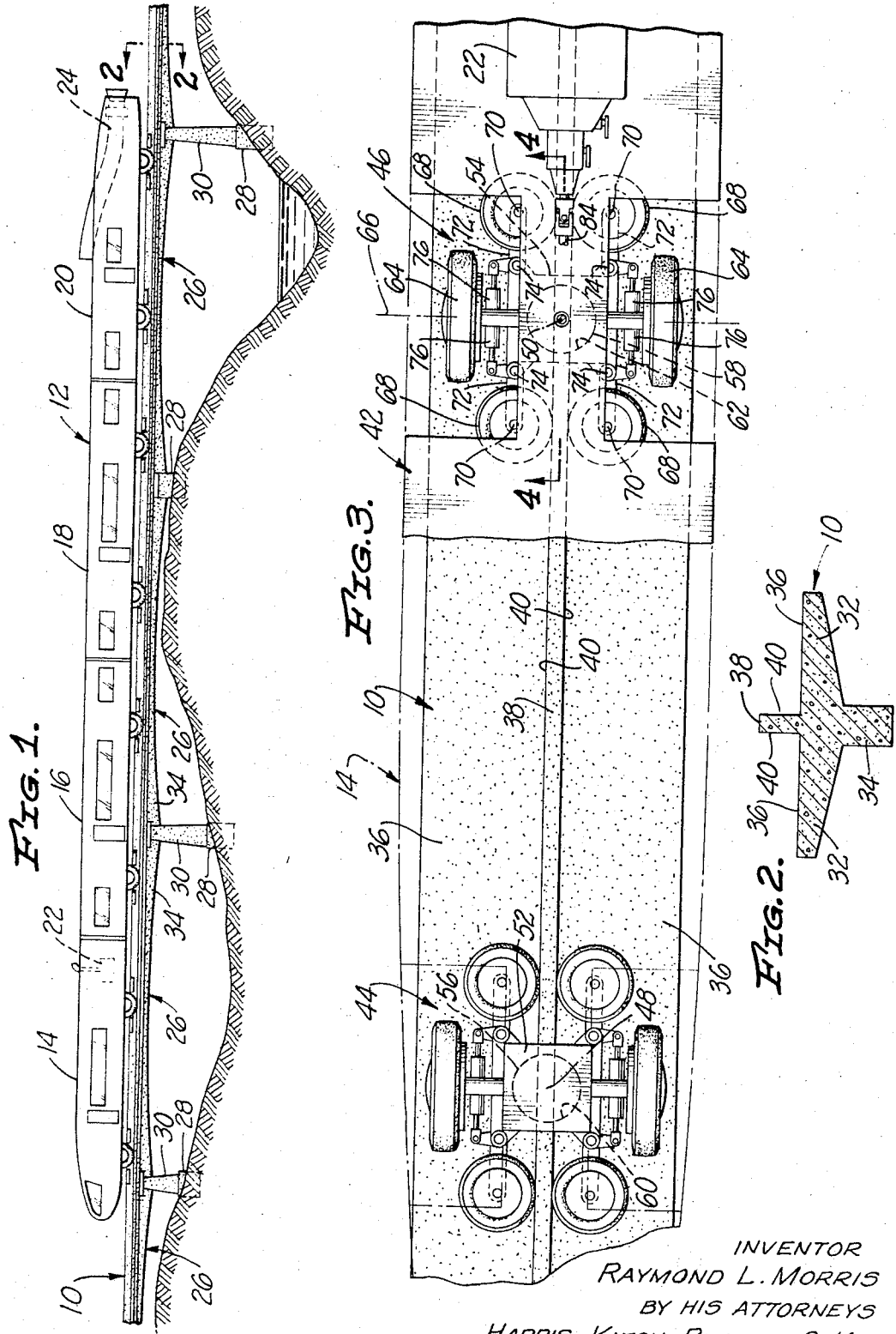
Feb. 11, 1969  R. L. MORRIS  3,426,703
MONORAIL VEHICLE SYSTEM
Filed July 28, 1966  Sheet 1 of 2
INVENTOR
RAYMOND L. MORRIS
BY HIS ATTORNEYS
HARRIS, KIECH, RUSSELL & KERN

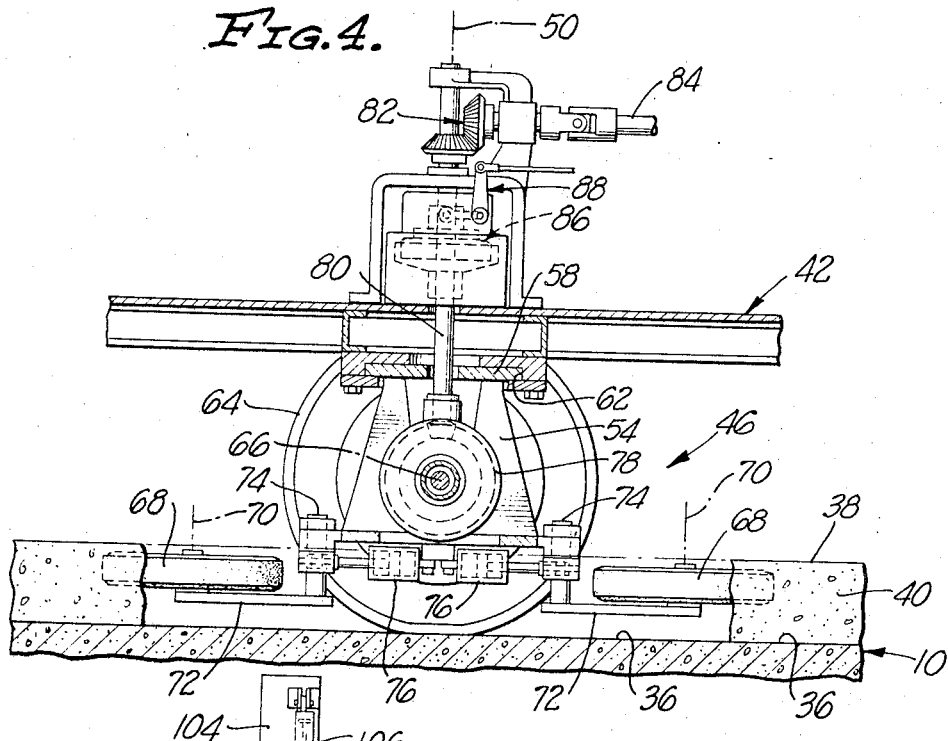
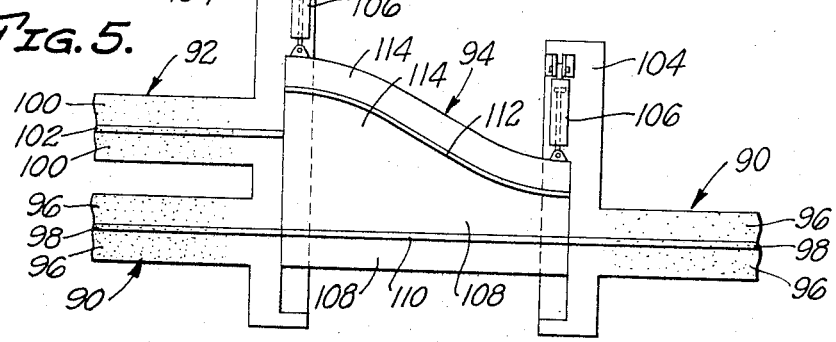
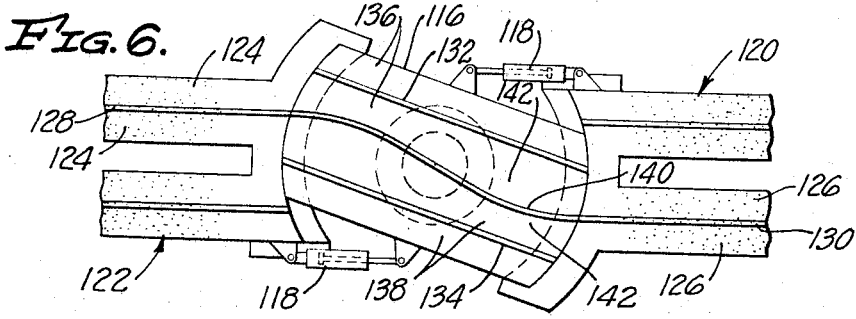

3,426,703
MONORAIL VEHICLE SYSTEM
Raymond L. Morris, 1028 15th Ave.,
Honolulu, Hawaii 96816
Filed July 28, 1966, Ser. No. 568,535
U.S. Cl. 105—145
Int. Cl. B61b *13/04;* B61c *11/06;* B61f *13/00*
7 Claims

ABSTRACT OF THE DISCLOSURE

A monorail system comprising a track having laterally spaced track surfaces separated by a central guide rail provided on opposite sides thereof with laterally spaced guide surfaces. The system includes a vehicle supported by two trucks pivotable about vertical axes. Two laterally spaced supporting wheels mounted on each truck respectively engage the track surfaces, and rotate about an axis perpendicular to the truck pivot axis so that the supporting wheels negotiate curves without skidding. Two pairs of guide wheels on each truck follow the central guide rail, one pair of guide wheels being located ahead of the supporting wheels and the other pair being located an equal distance behind the supporting wheels. Switches shunt the vehicle from one track to another.

BACKGROUND OF INVENTION

The present invention relates in general to what can best be described as a high-speed railway system and, more particularly, to a high-speed, track-supported, train-type vehicle and to a guidance system therefor.

In general, the invention contemplates a monorail system of the type comprising: a track having laterally spaced, parallel, horizontal, longitudinal track surfaces separated by a central guide rail provided on opposite sides thereof with laterally spaced, parallel, vertical, longitudinal guide surfaces; a vehicle having a frame supported by two longitudinally spaced trucks pivotable about vertical axes; at least two laterally spaced, vertical, supporting wheels mounted on the frame of each truck and respectively engaging the laterally spaced, longitudinal track surfaces and rotatable about a laterally-extending, supporting-wheel axis; and four horizontal guide wheels mounted on each truck frame and respectively rotatable about vertical guide-wheel axes spaced from the corresponding truck-pivot axis, two of the guide wheels of each truck being located ahead of the corresponding supporting wheels and engaging the respective guide surfaces of the central guide rail, and the other two guide wheels of each truck being located behind the corresponding supporting wheels and respectively engaging the two guide surfaces. (As used herein, the terms "horizontal" and "vertical" are relative terms, it being understood that surfaces and axes which are referred to as "horizontal" and "vertical" deviate from the true horizontal and vertical in proportion to the grade of the track and the degree to which it is banked in turns.)

OBJECTS OF INVENTION

A primary object of the invention is to provide a track-supported vehicle and guidance system of the foregoing type wherein the supporting-wheel axis of each truck intersects and is perpendicular to the corresponding truck-pivot axis, and wherein the guide wheel axes of each truck are substantially equidistant from the corresponding truck-pivot axis. In other words, each truck pivots about an axis perpendicular to and intersecting its supporting-wheel axis, and the front and rear guide wheels of each truck are located substantially equal distances ahead of and behind the supporting wheels thereof.

With the foregoing construction, when the vehicle is negotiating a curve in the track, the supporting-wheel axes coincide precisely with lines radiating from the center of the curve. Consequently, when negotiating a curve, the supporting wheels are always exactly tangent to the curved paths they must follow so that they negotiate such paths without skidding, which is an important feature.

Another and important object of the invention is to provide trucks wherein the guide wheels are carried by laterally movable, guide-wheel frames mounted on the corresponding truck frames, and to provide means interconnecting the respective truck frames and guide-wheel frames for constantly biasing the guide wheels into engagement with their respective guide surfaces on the central guide rail. A related object is to provide pivoted guide-wheel frames which are hydraulically biased in directions to maintain the guide wheels in engagement wtih their respective guide surfaces.

The foregoing construction not only insures proper engagement of the guide wheels with their respective guide surfaces, but it provides the guidance system with sufficient flexibility to accommodate irregularities in the guide surfaces. For example, this guidance system permits the guide wheels to yield slightly when negotiating junctions between straight and arcuate track sections so that such junctions can be traversed without binding, which is an important feature of the invention.

The foregoing objects, advantages, features and results of the invention, together with various other objects, advantages, features and results thereof which will be evident to those skilled in the art, may be achieved with the exemplary embodiments of the invention described in detail hereinafter and illustrated in the accompanying drawings.

DESCRIPTION OF DRAWINGS

In the drawings:

FIG. 1 is a side elevational view of a track and multi-car train which embody the invention;

FIG. 2 is an enlarged sectional view, taken as indicated by the arrowed line 2—2 of FIG. 1, illustrating the track cross section of the invention;

FIG. 3 is an enlarged plan view of the frame of a self-propelled vehicle or car of the invention showing its supporting, guidance and propulsion systems;

FIG. 4 is an enlarged, fragmentary sectional view taken as indicated by the arrowed line 4—4 of FIG. 3; and FIGS. 5 and 6 are plan views of crossover switches of the invention.

DETAILED DESCRIPTION OF INVENTION

Referring initially to FIG. 1 of the drawings, designated generally by the numeral 10 is a track for a high-speed train 12 of the invention which is shown as made up of four cars 14, 16, 18 and 20, it being understood that the invention is not limited to any particular number of cars.

For low-speed operation, e.g., speeds up to 80 miles per hour, the train 12 is driven by an internal combustion engine 22, preferably a diesel engine, carried by the front car 14, as will be described in more detail hereinafter. For high-speed operation, e.g., for speeds ranging from 80 to 150 miles per hour, or higher, the train 12 is driven by a jet engine 24 carried by the rear car 20. The intermediate cars 16 and 18 may be unpowered.

As will be discussed in more detail hereinafter, the various cars of the train 12 are provided with supporting and guide wheels equipped with pneumatic tires for engagement with smooth supporting and guide surfaces on the track 10. Consequently, extremely quiet operation of the train 12 results.

The track 10 is preferably formed of precast sections 26 of prestressed reinforced concrete. These track sections are supported at their ends either on cast-in-place concrete bases 28, or on piers 30 carried by such bases, depending upon the nature of the terrain. Preferably, the piers 30 are preformed, and are desirably made of precast, prestressed, reinforced concrete, the bases 28 being the only components of the track 10 which need be cast or otherwise formed in place. Consequently, extremely rough terrain, as suggested in FIG. 1, can be traversed with minimum construction costs. It will be noted that the track 10 can be constructed almost entirely by means of equipment supported by the completed portion thereof, which results in substantial savings.

Turning to FIG. 2 of the drawings, the track 10 is preferably generally T-shaped in cross section and includes two train-supporting flanges 32 projecting laterally from a central beam 34. As shown in FIG. 1, each beam 34 is preferably an arch. Such a track configuration is capable of supporting heavy loads over relatively long spans, the length of the track sections 26 preferably being of the order of sixty feet, or more, to minimize the number of piers 30 and/or bases 28 required.

The track flanges 32 provide laterally spaced, parallel, horizontal, longitudinal track surfaces 36 for engagement by supporting wheels of the individual cars or vehicles forming the train 12, as will be described in detail hereinafter. Separating the supporting track surfaces 36 is a central monorail 38 provided on opposite sides thereof with laterally spaced, parallel, vertical, longitudinal guide surfaces 40 for engagement by horizontal guide wheels of the cars of the train 12.

The supporting-wheel system and the guide-wheel system of the front car 14, and their relationships to the track and guide surfaces 36 and 40, are typical of those incorporated in the remaining cars. Consequently, only the supporting and guidance systems incorporated in the front car 14 will be considered, these being shown in FIGS. 3 and 4.

Referring thereto, the car 14 is provided with a frame 42 supported by longitudinally spaced, front and rear trucks 44 and 46 and pivotable relative thereto about vertical, truck-pivot axes 48 and 50. More particularly, the trucks 44 and 46 include truck frames 52 and 54 provided with turntables 56 and 58 received in turntable sockets 60 and 62 carried by the car frame 42. The turntables 56 and 58 are shown simply as journaled within the turntable sockets 60 and 62, but it will be understood that any desired bearing type may be used, the journal bearings shown being intended as illustrative only.

The front and rear trucks 44 and 46 both perform supporting and guiding functions and are identical in these respects. Consequently, only the rear truck 46, which also performs a driving function, will be considered in detail.

As shown in FIGS. 3 and 4, the rear truck frame 54 has mounted thereon two laterally spaced, vertical, supporting wheels 64 respectively engageable with the track surfaces 36 on opposite sides of the guide rail 38, these track surfaces being sufficiently wide for continuous engagement by the supporting wheels 64 in curves in either direction as well as on straightaways. The supporting wheels 64, which are mounted on the rear truck frame 54 in any suitable manner, are rotatable about a laterally-extending or transverse supporting-wheel axis 66 which intersects and is perpendicular to the corresponding truck-pivot axis 50, as clearly shown in FIGS. 3 and 4 of the drawings. The supporting wheels 64, as previously indicated, are provided with pneumatic tires engageable with the respective track surfaces 36 to provide extremely quiet operation.

The rear truck 46 also includes four horizontal guide wheels 68 respectively rotatable about guide-wheel axes 70 parallel to and spaced from the corresponding truck-pivot axis 50. Two of the guide wheels 68 are located ahead of the truck-pivot axis 50 and the supporting wheels 64 and respectively engage the two guide surfaces 40. The other two guide wheels 68 are located behind the truck-pivot axis 50 and the supporting wheels 64 and also respectively engage the two guide surfaces 40. The guide wheels 68 are also equipped with pneumatic tires for quiet operation.

An important feature of the invention is that the guide wheel axes 70 are all substantially equidistant from the truck-pivot axis 50. This relationship, in conjunction with the perpendicular, intersecting relationship of the truck-pivot and supporting-wheel axes 50 and 66, insures that the supporting-wheel axis 66 precisely coincides with a radial line through the center of any curve in the track 10. Consequently, the supporting wheels 64 are always exactly tangent to the curved paths they must follow in negotiating curved portions of the track surfaces 36 so that there is no skidding of the tires on these wheels, which is an important feature of the invention.

The guide wheels 68 are rotatably mounted on arm-like guide-wheel frames 72 pivotally connected to the truck frame 54 by vertical pivots 74 substantially equidistant from the truck-pivot axis 50. With this construction, the guide wheels 68 may swing laterally toward and away from their respective guide surfaces 40. Hydraulic cylinders 76 interconnecting the truck frame 54 and the respective guide-wheel frames 72 constantly bias the guide wheels 68 into engagement with their respective guide surfaces 40. This construction insures stability against swaying on curves or straightaways, while providing sufficient flexibility to compensate for any irregularities in the guide surfaces, such as those occurring at junctions of curves and straightaways. Consequently, hydraulically biasing the guide wheels 68 into engagement with the guide rail 38 insures that junctions of curves and straightaways, or junctions of curves having different radii, will be negotiated smoothly, which is an important feature of the invention.

Considering the driving function performed by the rear supporting wheels 64, these wheels are mounted on shafts interconnected by a conventional differential 78, FIG. 4, driven by a vertical drive shaft 80 the axis of which coincides with the pivot axis 50 of the rear truck 46. Bevel gearing 82 interconnects the drive shaft 80 and a propeller shaft 84 driven by the internal combustion engine 22.

As hereinbefore indicated, the internal combustion engine 22 in the front car 14 of the train 12 is utilized to propel the train in the low-speed range, and in areas where the jet engine 24 cannot be used. The jet engine 24 is utilized to propel the train 12 in the high-speed range. When the jet engine 24 is in use, the internal combustion engine 22 is uncoupled from the driving wheels 64 of the rear truck 46 of the front car 14, as by disengaging a clutch 86 in the drive shaft 80, utilizing a suitable clutch disengaging means 88. Thus, most of the driving connection to the supporting wheels 64 of the rear truck 46 is uncoupled when utilizing the jet engine 24 as a high-speed propulsion means. Individual clutches can be installed in the axles of the driving wheel 64 if it is desired to uncoupled the differential 78 also for high-speed, jet-engine operation.

As hereinbefore indicated, an important feature of the present invention is to provide means for switching individual cars or complete trains from one track to another utilizing only the guidance systems incorporated in the cars, i.e., without utilizing any auxiliary guidance systems. Such switches are shown in FIGS. 5 and 6 of the drawings and will now be described.

Turning to FIG. 5 first, illustrated therein is a track system which includes two parallel primary tracks 90 and 92 and a two-position, reciprocable switch 94. The track 90 may be regarded as a main line and the track 92 as a siding, the function of the switch 94 being to permit through traffic on the main line 90, or to shunt traffic from the main line onto the siding 92, or vice versa.

It will be understood that the tracks 90 and 92 are identical to the track 10 and that each includes two track surfaces separated by a central guide rail. The track surfaces and central guide rail of the main line 90 are designated by the numerals 96 and 98, respectively, while the track surfaces and central guide rail of the siding 92 are designated by the numerals 100 and 102, respectively.

The switch 94 is reciprocable between its two positions along guides or ways 104 by means of hydraulic cylinders 106, or other suitable means. When the switch 94 is in the position shown in FIG. 5, in-line track surfaces 108 thereon, and separated by an in-line central guide rail 110, permit through traffic on the main line 90, utilizing supporting wheels and guide wheels corresponding to the supporting wheels and guide wheels 64 and 68 hereinbefore described.

When the switch 94 is displaced transversely into its other position, a generally S-shaped crossover guide rail 112 connects the siding 92 to the right-hand portion of the main line 90, the ends of the crossover guide rail 112 registering with the corresponding ends of the guide rails 98 and 102. On opposite sides of the crossover guide rail 112 are complementary track surfaces 114. As will be apparent, the crossover guide rail 112 is engageable by guide wheels corresponding to the guide wheels 68 to switch a car or cars between the main line 90 and the siding 92, supporting wheels corresponding to the supporting wheels 64 rolling along the complementary track surfaces 114 during the switching operation. Thus, the basic supporting and guidance systems hereinbefore described are utilized during the switching operation, no auxiliary switching wheels, or the like, being necessary, which is an important feature of the invention.

FIG. 6 of the drawings illustrates a similar switching arrangement which utilizes a pivotable switch 116 suitably movable between two positions, as by means of hydraulic cylinders 118. The switch 116 is shown as capable of switching cars or trains between two parallel tracks 120 and 122 constituting main lines. The tracks 120 and 122 respectively have track surfaces 124 and 126 separated by central guide rails 128 and 130. When the switch 116 is in what might be referred to as its in-line position, central guide rails 132 and 134 are aligned with the respective central guide rails 128 and 130. The central guide rails 132 and 134 respectively separate track surfaces 136 and 138 respectively registrable with the track surfaces 124 and 126.

When the switch 116 is in what might be referred to as its crossover position, shown in FIG. 6, a generally S-shaped crossover guide rail 140 interconnects the guide rails 128 and 130, the crossover guide rail being provided on opposite sides thereof with complementary track surfaces 142. When the switch 116 is in the crossover position shown in FIG. 6, cars or trains traveling in either direction on either of the tracks 120 and 122 may be switched to the other track, and caused to travel in either direction thereon, by appropriate maneuvering of the cars or trains. As in the case of the switch 94, the the switching 116 requires only supporting and guide wheels corresponding to the hereinbefore-described supporting and guide wheels 64 and 68, no auxiliary guidance and/or supporting systems being necessary.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim as my invention:

1. In a vehicle for use on a track having laterally spaced, parallel, horizontal, longitudinal track surfaces separated by a central guide rail provided on opposite sides thereof with laterally spaced, parallel, vertical, longitudinal guide surfaces, the combination of:
  (a) a vehicle frame;
  (b) two longitudinally spaced trucks supporting said vehicle frame and connected to said vehicle frame for pivotal movement relative thereto about vertical, truck-pivot axes;
  (c) each of said trucks including two laterally spaced, vertical, supporting wheels respectively engageable with said track surfaces and rotatable about a laterally-extending, supporting-wheel axis intersecting and perpendicular to the corresponding truck-pivot axis;
  (d) each of said trucks also including four horizontal guide wheels respectively rotatable about guide-wheel axes parallel to and spaced from the corresponding truck-pivot axis;
  (e) two of said guide wheels of each truck being located ahead of the corresponding truck-pivot axis and respectively being engageable with said guide surfaces, and the other two of said guide wheels of each truck being located behind the corresponding truck-pivot axis and respectively being engageable with said guide surfaces; and
  (f) said guide-wheel axes being substantially equidistant from the corresponding truck-pivot axis.

2. A vehicle as defined in claim 1 wherein each of said trucks includes a truck frame and wherein said guide wheels are carried by laterally movable, guide-wheel frames mounted on the corresponding truck frame, each of said trucks further including means interconnecting the corresponding truck frame and the corresponding guide-wheel frames for biasing the corresponding guide wheels into engagement with the corresponding guide surfaces.

3. A vehicle as defined in claim 1 wherein each of said trucks includes a truck frame and wherein said guide wheels are carried by laterally movable, guide-wheel frames pivotally mounted on the corresponding truck frame, each of said trucks further including hydraulic means interconnecting the corresponding truck frame and the corresponding guide-wheel frames for biasing the corresponding guide wheels into engagement with the corresponding guide surfaces.

4. A vehicle as defined in claim 1 including driving means for driving said supporting wheels of one of said trucks, said driving means including a vertical drive shaft the axis of which coincides with the truck-pivot axis of said one truck, said driving means further including means connecting said vertical drive shaft to said supporting wheels of said one truck.

5. In a vehicle for use on a track having laterally spaced, parallel, horizontal, longitudinal track surfaces separated by a central guide rail provided on opposite sides thereof with laterally spaced, parallel, vertical, longitudinal guide surfaces, the combination of:
  (a) a vehicle frame;
  (b) two longitudinally spaced trucks supporting said vehicle frame and connected to said vehicle frame for pivotal movement relative thereto about vertical, truck-pivot axes;
  (c) each of said trucks including a truck frame carrying two laterally spaced, vertical, supporting wheels respectively engageable with said track surfaces and rotatable about a laterally-extending, supporting-wheel axis intersecting and perpendicular to the corresponding truck-pivot axis;
  (d) each of said trucks also including four guide-wheel frames respectively carrying horizontal guide wheels rotatable about guide-wheel axes parallel to and spaced from the corresponding truck-pivot axis;
  (e) two of said guide wheels of each truck being located ahead of the corresponding truck-pivot axis and supporting wheels and respectively being engageable with said guide surfaces, and the other two of said guide wheels of each truck being located behind the corresponding truck-pivot axis and supporting wheels and respectively being engageable with said guide surfaces;

(f) said guide-wheel frames of each truck being mounted on the corresponding truck frame for lateral movement of the corresponding guide wheels toward and away from the coresponding guide surfaces; and (g) means interconnecting the truck frame and the guide wheel frames of each truck for biasing the guide wheels thereof into engagement with the corresponding guide surfaces.

6. A vehicle as defined in claim 5 wherein said guide-wheel frames of each truck are pivotally mounted on the corresponding truck frame.

7. A vehicle according to claim 6 wherein said biasing means comprises hydraulic means.

References Cited

UNITED STATES PATENTS

| | | | |
|---|---|---|---|
| 685,822 | 11/1901 | Cook | 104—99 |
| 2,969,751 | 1/1961 | Toulmin | 105—74 |
| 2,977,893 | 4/1961 | Rosenbaum | 104—120 X |
| 2,997,965 | 8/1961 | Hawes | 104—120 |
| 3,240,291 | 3/1966 | Bingham | 188—33 |

ARTHUR L. LA POINT, *Primary Examiner.*

H. BELTRAM, *Assistant Examiner.*

U.S. Cl. X.R.

104—120; 105—74, 215